COMMUNICATION SYSTEM UTILIZING SELECTIVE SWEEP PATTERN

Filed July 3, 1961 2 Sheets-Sheet 1

*INVENTOR.*
JOHN HAYS HAMMOND JR.
*BY* [signature]
ATTORNEY

March 7, 1967 J. H. HAMMOND, JR 3,308,381

COMMUNICATION SYSTEM UTILIZING SELECTIVE SWEEP PATTERN

Filed July 3, 1961 2 Sheets-Sheet 2

*INVENTOR.*
JOHN HAYS HAMMOND JR.
*BY*

ATTORNEY

United States Patent Office 3,308,381
Patented Mar. 7, 1967

3,308,381

COMMUNICATION SYSTEM UTILIZING SELECTIVE SWEEP PATTERN

John Hays Hammond, Jr., % Hammond Research Corp., Gloucester, Mass. 01930; Ralph G. Lucas, Nathaniel L. Leek, and The National Shawmut Bank, executors of said John H. Hammond, Jr., deceased Filed July 3, 1961, Ser. No. 121,586
5 Claims. (Cl. 325—349)

This invention relates to radio communication systems for code signalling and more particularly to a system possessing a high degree of selectivity and improved signal-to-noise ratio.

The system includes a transmitter whose carrier wave is modulated by two alternating currents having frequencies whose ratio is a small whole number. The signal may be transmitted by varying in dot-dash code the phase or amplitude of one or both of the modulating currents.

The receiver comprises the usual tuned input circuits, the heterodyne oscillator and intermediate frequency amplifiers of the common superheterodyne type receiver. The detector following the intermediate frequency amplifiers demodulates the signal giving currents of the two modulating frequencies. These two currents are fed to a device which gives a signal only when these two received modulation currents have the proper ratio of amplitudes and the proper phase relation.

The device for the discrimination of phase relation and ratio of amplitudes comprises a tube similar to a cathode-ray tube, having an electron beam, means for deflecting the electron beam laterally in two right angle planes, and a fluorescent screen. Since the two reserved modulating currents have frequencies of a single ratio, these two currents applied to the two deflecting means produce a stationary Lissajous' figure.

Slots are cut in the screen to permit the electron beam at certain times to pass through the screen and impinge on one common electrode or on separate electrodes. The slots may be located so as to provide pulses evenly spaced in time for the predetermined phase relation and ratio of amplitudes. These pulses of current, striking a common electrode, are used to excite a tuned circuit thus providing the final signal. If the phase relation of the two modulation currents or their ratio amplitude is altered the Lissajous' figure changes in shape. The current pulses through the slots then will not be equally spaced in time and the signal will not be produced.

A modification of this phase discriminator is provided by having separate electrodes located behind the slots, each connected to an amplifier and a relay. All relay contacts are the connected in series and to a signal indicator such as a telegraph pounder. Hence only when the electrons pass through all slots is a signal produced.

Other modifications of the output circuit comprising the slotted screen of the cathode-ray tube may be made by cutting the slots on the Lissajous' figure in a manner to produce any particular sequential pattern of pulses and circuits excited only when the particular sequence pattern obtains.

The invention also consists in certain new and original features of construction and combinations of parts hereinafter set forth and claimed.

The nature of the invention, as to its objects and advantages, the mode of its operation and the manner of its organization, may be better understood by referring to the following description, taken in connection with the accompanying drawings forming a part thereof, in which.

Like reference characters denote like parts in the several figures of the drawing.

In the following description parts will be identified by specific names for convenience, but they are intended to be generic in their application to similar parts.

Figure 1:
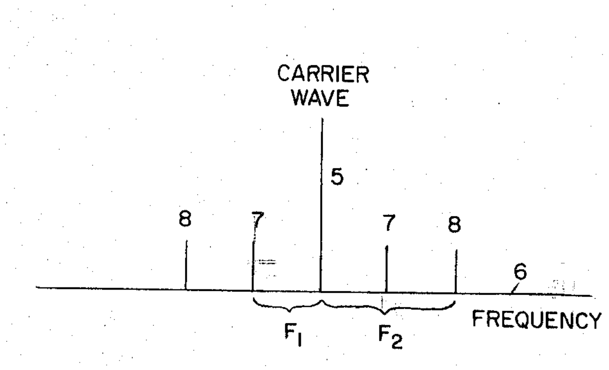
FIG. 1 shows the frequency spectrum of the transmitted wave.

The operation of the present invention does not require a new type of transmitter but it does require a special modulation of a standard radio carrier wave. Referring to FIG. 1, the carrier wave 5 is shown plotted on a frequency scale 6. The frequency of this carrier wave may be of any value from the lowest to the highest of practical radio carrier waves.

This carrier wave 5 is amplitude modulated or frequency modulated at two lower frequencies $F_1$ and $F_2$ giving side bands 7 and 8, respectively. The modulating frequencies $F_1$ and $F_2$ must have a simple ratio one to the other, such for example as 2 to 1. The modulating currents must however be of fixed phase relation and of fixed ratio of amplitudes. The message is sent by altering the phase or amplitude ratio or both in a code sequence.

Figure 2:
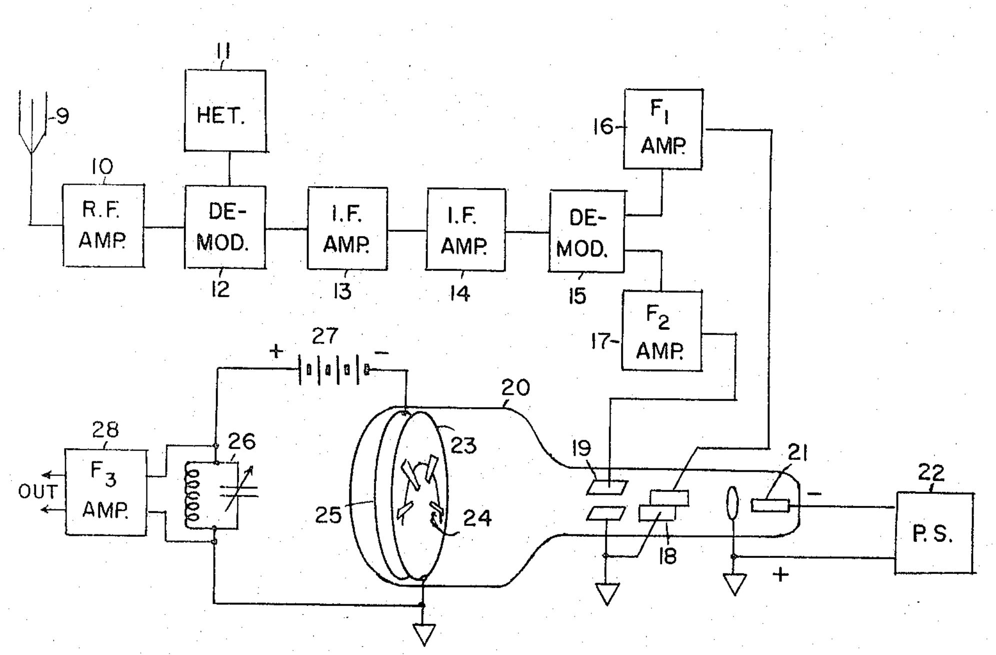
FIG. 2 is a schematic diagram of the receiver.

The receiver, shown in FIG. 2, comprises a standard superheterodyne circuit for the first portion up to the final demodulator, and then a second portion which is of special and novel design.

The first portion of the receiver includes the antenna 9 which feeds the radio frequency amplifier 10. The radio frequency signal from the amplifier 10 is combined with the oscillations from the heterodyne 11 in the demodulator 12 to produce an intermediate frequency wave of suitable frequency. The intermediate frequency wave, modulated at frequencies $F_1$ and $F_2$ is amplified by the IF amplifiers 13 and 14.

The second and novel portion of the receiver comprises the demodulator 15, the amplifiers 16 and 17 and the special cathode-ray tube 20 and the associated circuits. The output of amplifier 14 is demodulated in block 15 to yield currents of the two frequencies $F_1$ and $F_2$. These two currents are amplified by simple amplifiers 16 and 17. At least one of these amplifiers is provided with a gain control and a phase control to adjust the two currents of frequencies $F_1$ and $F_2$ to have the predetermined amplitude ratio and phase relation established by the transmitter. Such adjustment may be necessary to compensate for any distortion produced during transmission or because of changes in circuits.

The two voltages or currents of frequencies $F_1$ and $F_2$ from amplifiers 16 and 17 are fed to deflecting means 18 and 19 of the special cathode-ray tube 20. The two deflecting means 18 and 19 which may be for current or for voltage deflection, cause deflection of the electron beam from electron gun 21 in right angle directions. The electron beam is provided by power supply 22.

The electron beam impinges on a metal screen 23 coated with a fluorescent powder in order to make the deflected path of the electron beam visible to aid in making adjustments in phase and amplitude.

Certain specially located slots 24 are cut through metal screen 23 to permit electrons to pass to collector plate 25. In the particular embodiment of the invention illustrated in FIG. 2, a tuned circuit 26 and accelerating voltage 27 are connected in series between plate 25 and screen 23. The voltage across circuit 26 excited by the timed electron pulses passing through the slots in screen 23, is amplified by amplifier 28 and provides the output signal.

Figure 3:
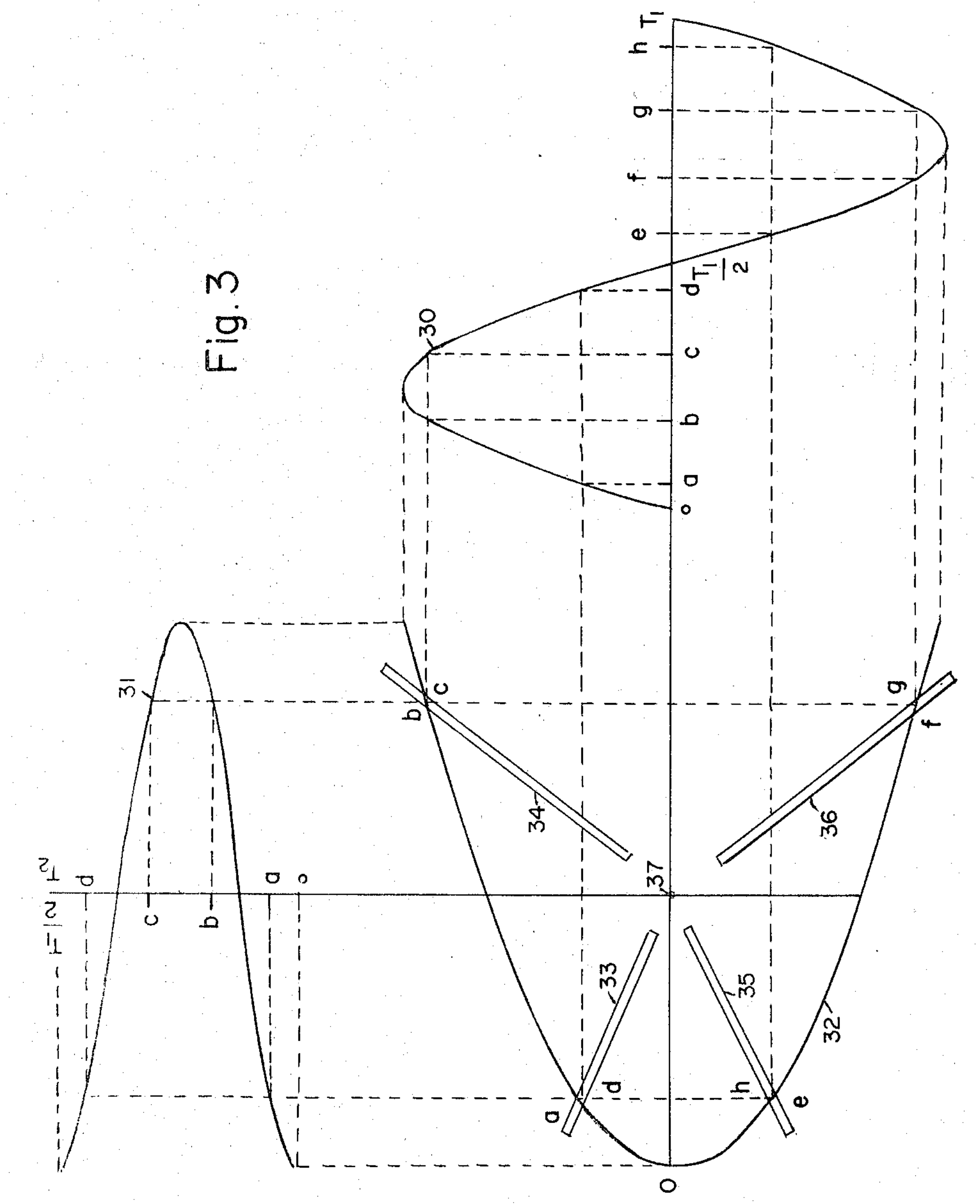
FIG. 3 shows one form of the screen of the special cathode-ray tube.

The operation of the cathode-ray tube 20 is further explained by referring to FIG. 3. The two waves of frequency $F_1$ and $F_2$ are shown by waves 30 and 31, respectively, wave 31 being in this case, twice the frequency of wave 30. The Lissajous' figure for one particular phase relation of $F_1$ and $F_2$ is shown as trace 32. Slots 33, 35 and 36, radiating from center 37, are so placed that the pulses of electrons passing through these slots occur in a special time sequence. For example, for the arrangement shown in FIG. 3, the pulses occur at times *a*, *b*, *c*, *d*, *e*, *f*, *g*, and *h* on the time axis of wave 30. These times are equally spaced and give rise to pulses eight times the frequency $F_1$ or four times the frequency $F_2$. Hence if $F_1$ were 150 cycles per second there would be 1200 pulses per second. Circuit 28 in FIG. 2 would then be tuned to a frequency of 1220 cycles per second.

If now the phase relation between waves $F_1$ and $F_2$ or the ratio of their amplitudes changes, the Lissajous' figure would change in shape. The altered figure would cause the time sequence of the electron pulses to change and the final output device would not be excited.

The slots in screen 23 are cut radially from center 37 to ensure an output current over a range of intensities of received radiation. If the slot widths were proportional to the distance from center 37 the electron pulses would be of the same strength independent of the size of the Lissajous' figure and hence independent of the strength of the received radiation. Therefore, the output signal would be of constant strength over a large range of spectrum strength. It follows then that the familiar phenomenon of fading would cause no variation in output signal.

Although only a few of the various forms in which this invention may be embodied have been shown herein, it is to be understood that the invention is not limited to any specific construction but may be embodied in various forms without departing from the spirit of the invention.

What is claimed is:

1. A radio communication system comprising a receiver adapted to receive a radio carrier wave modulated in a code sequence by a pair of signal waves having predetermined frequencies and predetermined phase and amplitude relationships, said receiver having demodulating means adapted to derive from said carrier wave a pair of signal voltages corresponding in frequency, phase and amplitude to said signal waves, said receiver having a cathode-ray tube having an electron gun adapted to produce an electron beam and having deflecting elements, means supplying said signal voltages to said deflecting elements to cause said beam to sweep in a path determined by the relative frequency, phase and amplitude characteristics of said signal waves, a screen in said tube disposed to intercept said beam having a series of openings disposed at uniformly spaced points along a predetermined path of said beam and a collector plate in said tube disposed to intercept the beam passing through said openings, a tuned circuit connected to said plate to be pulsed when said beam impinges on said plate, said circuit being tuned to a pulse frequency representative of said predetermined path, and a response circuit connected to said tuned circuit to be energized thereby.

2. A receiver for a radio carrier wave modulated by a pair of signal waves having predetermined frequencies and predetermined phase and amplitude relationships, comprising means to receive said carrier wave, means to demodulate said carrier wave to derive therefrom a pair of signal voltages corresponding to said signal waves, a cathode-ray tube having means producing an electron beam, deflection means, and means supplying said signal voltages to said deflection means to cause said beam to be deflected in a sweep path determined by said signal voltages, a collector plate in said tube in the path of said beam and adapted to be energized thereby, and a screen disposed to intercept said beam in advance of said plate having openings disposed uniformly along a predetermined sweep path of said beam whereby said plate is pulsed at a predetermined rate when said beam sweeps in said predetermined path, and a tuned circuit connected to respond to said pulse rate and having means producing a signal when so pulsed.

3. A receiver as set forth in claim 2 in which said tuned circuit is connected in series with a source of acceleration voltage between said screen and said plate for pulsing by said beam.

4. A receiver as set forth in claim 2 in which said screen openings are in the form of radial slits disposed along said predetermined path.

5. A receiver as set forth in claim 4 in which said slits are of equal angular width throughout their length.

References Cited by the Examiner

UNITED STATES PATENTS

| | | | |
|---|---|---|---|
| 2,415,918 | 2/1947 | Thomas | 325—42 |
| 2,974,295 | 3/1961 | Rydbeck et al. | 328—231 |

KATHLEEN H. CLAFFY, *Primary Examiner.*

CHESTER L. JUSTUS, *Examiner.*

R. S. BELL, *Assistant Examiner.*